UNITED STATES PATENT OFFICE.

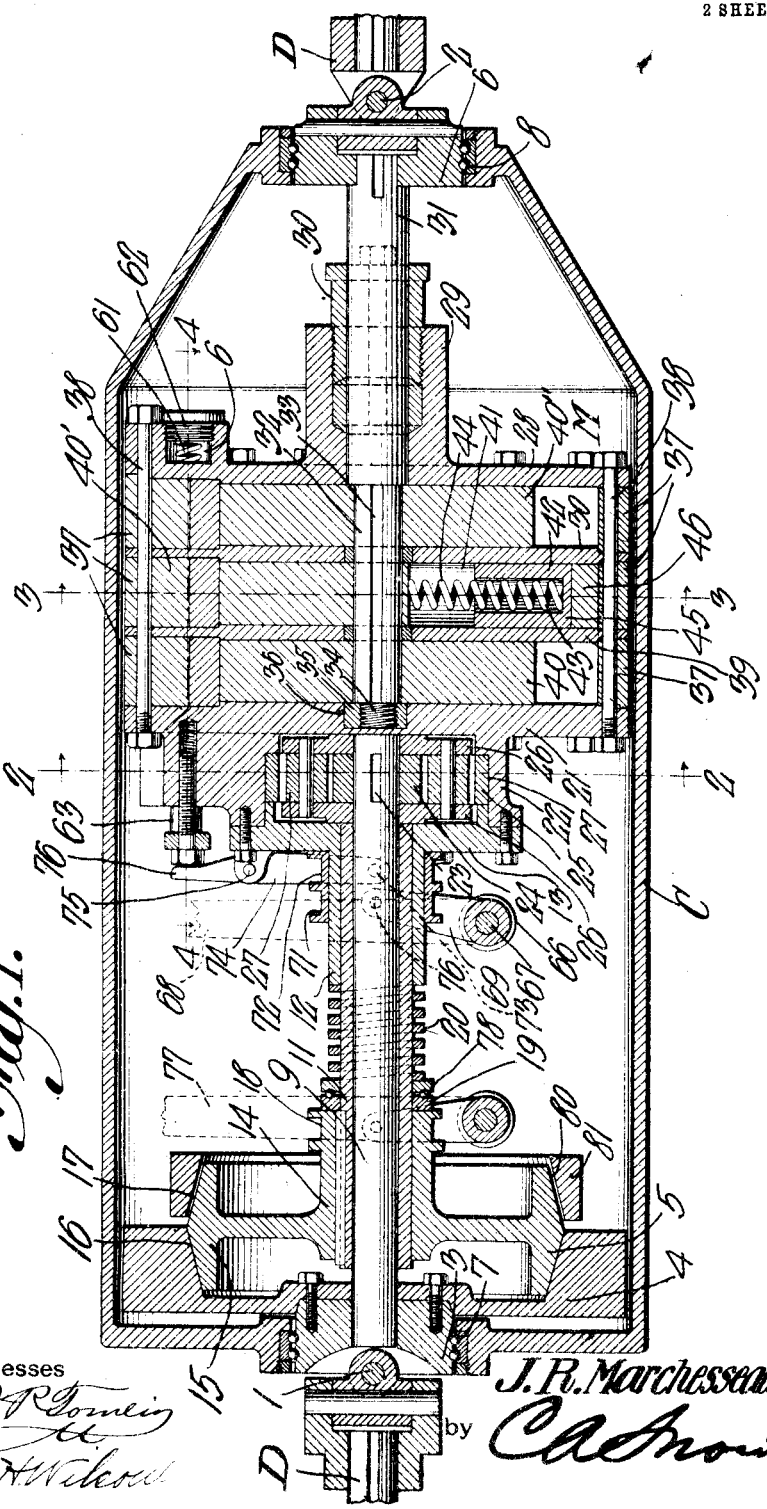

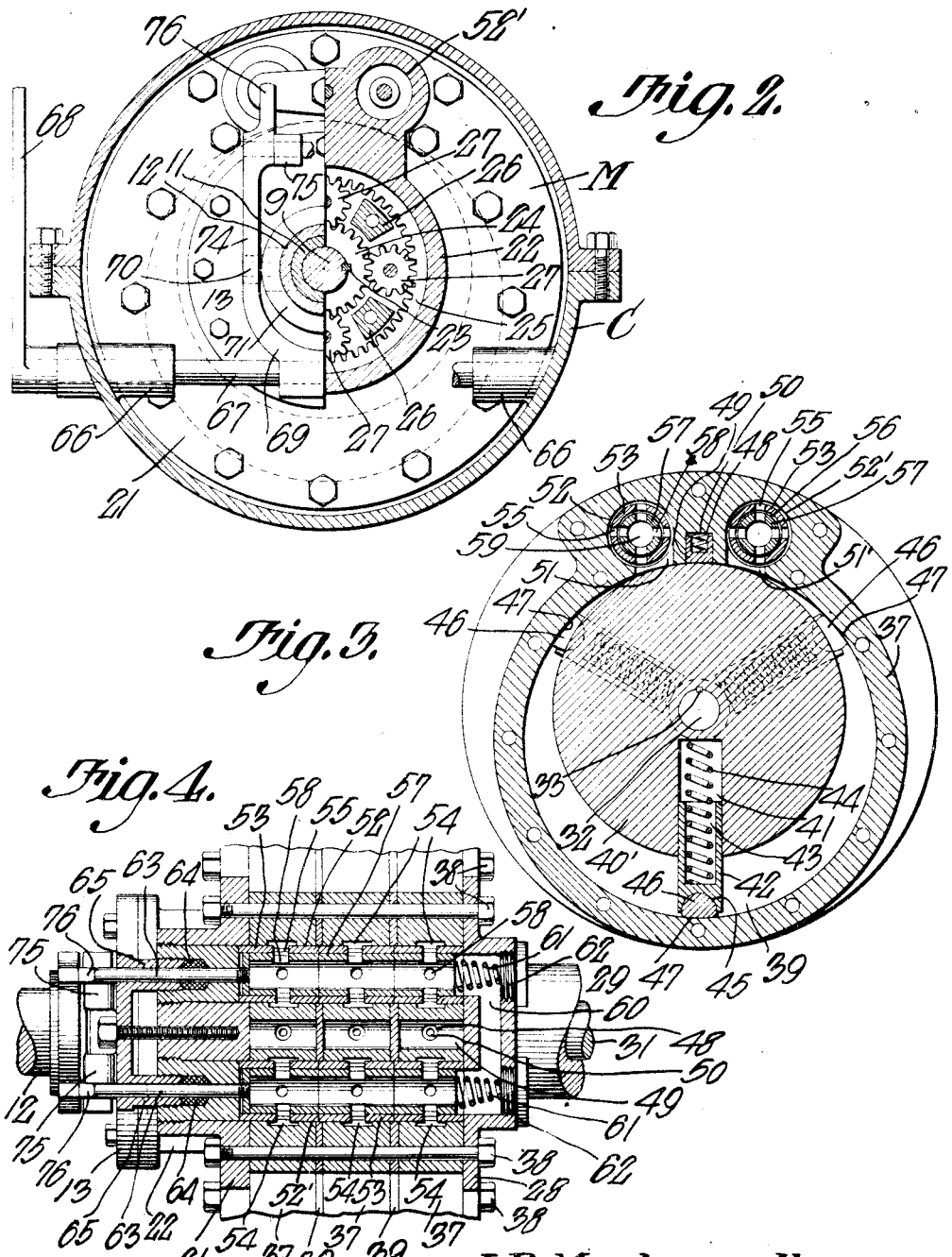

JOSEPH ROI MARCHESSEAULT, OF MOOSUP, CONNECTICUT.

CLUTCH.

1,056,922.   Specification of Letters Patent.   Patented Mar. 25, 1913.

Application filed January 2, 1912. Serial No. 668,937.

*To all whom it may concern:*

Be it known that I, JOSEPH ROI MARCHESSEAULT, a citizen of the United States, residing at Moosup, in the county of Windham and State of Connecticut, have invented a new and useful Clutch, of which the following is a specification.

The present invention relates to improvements in clutches, the primary object of the invention being the provision of a novel form of variable speed forward and reverse hydraulic or fluid transmission clutch operably disposed between a driving and driven element, and more especially adapted for use in connection with automobile and motor boat construction.

A further object of the present invention is the provision of a clutch embodying a main casing, which is disposed between the driving and driven elements in a stationary manner and has disposed therewithin one end of the driving element shaft carrying the main fly wheel and clutch thereof, while on the other end thereof is mounted for rotation the forward end of the driven element's shaft, a rotor casing being disposed within the main casing and operably connected to the driven element's shaft, while a rotor is mounted within said rotor casing and operably connected to the driven element's shaft, there being means provided whereby the fluid preferably oil, contained within the rotor casing may be permitted to circulate, or be held static, to regulate the transmission between the driving element and driven element, and to further provide a reversing mechanism whereby the rotation of the driven element may be in the opposite direction to the rotation of the driving element.

A still further object of the present invention is the provision of a novel form of valve construction disposed in operable relation to the rotor chamber and rotors, whereby the control of the movement of the fluid within the rotor chamber will produce in the transmission from the driving to the driven element, various graduations of speed, such graduations being increased or decreased without any perceptible jar or jolting as is usually occasioned by the movement of the various gears of the transmission gears, used more generally, the nearer the liquid being held to a static condition, the more rigid the connection between the driving and driven elements, the free movement or circulating action of the liquid within the rotor permitting the driving element to rotate without affecting the driven element.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a longitudinal sectional view through the complete clutch, the parts being in normal position, that is when the fluid is permitted to circulate through the rotor casing without impeding the rotor and causing motion to be transmitted from the driving to the driven element. Fig. 2 is a section taken on line 2—2 of Fig. 1, the portion to the left of the rotor casing and operating mechanism being shown in elevation. Fig. 3 is a section taken on line 3—3 of Fig. 1, dotted lines indicating the position of the various pistons of all three rotors, or rotor members. Fig. 4 is a section taken on line 4—4 of Fig. 1, the valves being shown in their normal position to permit the rotation of the rotor casing without affecting the rotors.

Referring to the drawings, D indicates the driving shaft or driving element, and D' indicates the driven shaft or driven element. These elements are used in connection with motor boats or automobiles to indicate the explosive motor and the differential shafts, respectively. Interposed between the respective ends of the shafts, is the main casing C, which incloses the clutch mechanism to be fully hereinafter described. The respective elements D and D' are provided with the flexible or universal joints 1 and 2, and connected to one member of the universal joint or flexible connection 1, is the hub 3 to which is connected the fly wheel 4 provided with the clutch portion 5, of usual construction. Connected to the inner member of the flexible or universal joint 2 of the driven element, is a hub 6, said hubs 3 and 6 being anti-frictionally supported in the respective ends of the main casing C through the medium of the roller or ball bearings 7 and 8, respectively.

The casing C is mounted stationarily at any desired point between the driving and driven elements, and by reason of the flexible or universal joints 1 and 2, respectively, the same need not of necessity be alined directly with the engine or motor shaft and the driven shaft.

Connected to and rotatable with the hub 3 within the casing C concentrically thereof, is the shaft 9. A key or spline 10 is carried by the sleeve 11, which is rotatably mounted upon the shaft 9. This sleeve 11 has its inner end journaled about the shaft 9 and within the hub 12 of the head 13, and its other end is keyed to the hub 14 of the double clutch wheel 15. The clutch wheel 15 is provided with the forward clutch member 16 and the reverse clutch member 17, the entire clutch wheel 15 being slidably mounted upon, but rotatable with, the sleeve 11, so as to normally assume the position as shown in Fig. 1 when the sleeve 11 and shaft 9 are being rotated in the same, or forward direction with the driving element D, or to be held stationary, when the rotor casing is rotated in an opposite direction, to cause a reverse movement in the shaft D', as will presently appear.

The hub 14 is provided with the spooled portion 18 while mounted upon the sleeve 11 adjacent to the hub 14, is the thrust bearing or ring 19, which is normally held toward the hub 14 by means of the spring 20, which is mounted upon the sleeve 11 between the hub 12 and the thrust bearing ring 19. The spring 20 normally holds the forward clutch surface 16 into engagement with the clutch 5 of the fly wheel 4.

The rotor casing M is mounted within the casing C and is provided with the forward head 21, carrying the projecting portion 22, which provides a casing with the head 13 for the reversing mechanism. This reversing mechanism consists of the key 23 carried by the shaft 9 and the main or central gear 24, which is disposed for rotation between the disks 26, which carry the intermediate gears 27. The intermediate gears 27 are in mesh at all times with the gear 24 and the teeth of the band gear 25, which is keyed to the inner peripheral wall of the casing formed by the projecting portion 22 of the head 21. The operation of this reversing mechanism will be described later.

The other head 28 of the rotor casing is provided with the hub 29, carrying the stuffing box 30 for the rotatable reception of the shaft 31, which is keyed to and rotatable with the disk or hub 6. The shaft 31 is provided with the reduced portion 32 mounted within the rotor casing and provided with the key 33 throughout the length thereof. The extreme inner end of the shaft 31 is further reduced as at 34 and carries the bushing 35, which is rotatably mounted within the recess 36 upon the inner side of the head 21, thus providing with the stuffing box 30 and the hub 29 the bearings for the shaft 31.

Disposed between the respective heads 21 and 28 of the rotor casing, are the bands or members 37, the tie-bolts or rods 38 being passed therethrough, as illustrated, to hold the heads and the said rings 37 in rigid relation to provide the casing with the two partitions 39, which divide the said casing into three rotor chambers, with the respective rotors 40, 40' and 40'' mounted eccentrically therewithin to provide the crescent shaped space as illustrated in Fig. 3.

Each one of the respective rotors are provided with the cut-away portion 41, which is disposed radially and has mounted for sliding movement therewithin, the single piston 42 having the socket 43 for the reception of the spring 44. The spring 44 is mounted within the slot 41, so as to exert a tension upon the piston to hold the outer end thereof toward the peripheral wall of its respective rotor chamber. Formed in the outer end of each of the respective pistons, is a concaved channel or recess 45 for the oscillating reception of the packing strips 46, each one of which is provided with a surface to correspond to the recess 45 of its piston and with the outer surface 47, which corresponds to the arc of the inner peripheral wall of its respective rotor chamber. The respective rotors 40, 40' and 40'' are so keyed upon the shaft 32 as to have their respective pistons presented at 120° to each other, as clearly shown in full and dotted lines in Fig. 3. This construction provides a means whereby the rotors will act, or be acted, upon by the fluid within the respective rotor chambers, so that the fluid will be permitted to circulate due to the rotation of the rotor casing about the rotors as will presently appear, or be held in a static condition, to form a cushioning and yet proper abutting means, to cause the respective rotors to be rotated with the rotor casing and thus transmit motion from the driving element to the driven element.

In each one of the respective rotor chambers near the top thereof, is formed a recess 48 in which is mounted a packing ring 49, normally held downwardly and in engagement with the periphery of the respective rotors, to prevent the passage of any of the fluid within the respective rotor chambers beyond such point, while each of the respective rotor chambers is provided with the ports 51 and 51', leading into the respective longitudinal bores 52 and 52' formed at the upper portion of the rotor casing as clearly shown in Figs. 2, 3 and 4. Mounted within each one of the respective bores 52 and 52' is a bushing 53 which is provided with three circumferential grooves 54, each one of which registers with its respective port 51 or 51' and provides a circulating medium for the fluid about the respective bushings, as will presently appear. These bushings are each further provided with the ports 55, which are in communication with their respective grooves 54 to permit the fluid to pass therethrough, and when in registration with the ports 58 and the grooves 56 of the hollow cylindrical longitudinally movable valves 57, to permit the fluid to enter the central bores 59 of said valves and finally into the by-pass 60, which forms a communication between the bores of the respective valves 57. Each one of these valves is further provided with the circumferential grooves 56 which aline with their respective series of ports 58 to permit the circulation of the fluid around the respective valves 57 and in line with the ports 55 and grooves 54 of the bushings. The springs 61 and adjusting plugs 62 normally hold the respective valves 57 so that the ports 58 will aline with the ports 55 of the bushings 54, thus permitting free egress of the fluid within the respective rotor chambers from the central bore of each valve through the by-pass 60 and into the opposite side of the respective rotor chambers through their respective ports 51 and 51'. Two valves, instead of one, are employed, in order that a better sealing of the liquid when the valves are closed may be had and also that the cylinders may be better balanced. By this means the rotation of the rotor chamber about the pistons of the respective rotors, will cause the fluid within the respective chambers to circulate freely and not affect the rotation of the driven element. In order, however, to provide a means whereby the circulation of the fluid or liquid within the rotor chambers may be retarded and finally held in a static condition, and thus provide a means, whereby motion may be transmitted from the rotor casing to the rotors and finally to the driven element, each valve 57 is provided with a stem 63 slidably mounted through the stuffing box 54 and the adjusting plate 65. The stem 63 is projected exteriorly of the rotor casing to be operated through a lever and manually controlled mechanism, so that the respective valves may be moved simultaneously inwardly and against the tension of the springs 61 so that the registration of the respective ports 58 of the valves 57 with the ports 55 of the bushing 54 may be decreased proportionately to the speed that is desired to drive the driven element. The mechanism for preferably operating these valves against the tension of the springs 61 consists of the shaft 67, mounted transversely in the lower portion of the casing C in the journals or bearings 66, and it is controlled through the lever 68 by any well known means. Carried upon the shaft 67 within the casing C and below the sleeve 11, is a yoke 69, whose terminals 70 are in engagement at all times with the grooved spool 71. This spool 71 is slidably mounted upon the bushing or hub 12 of the rotor casing and is further provided with the spool portion 72 in which is mounted the yoke end 73 of the lever 74. The lower end of said lever 74 is pulled outwardly and as said lever 74 is pivoted to the lug 75, with its free end disposed in operable relation to the outer ends of the pins 63, said outer ends 76 will be depressed or moved inwardly to engage the said pins 63 and thus slide the valves 57 inwardly against the tension of the springs 61. By this means the movements of the lever 74 will regulate the desired registration of the ports of the valves 57 and the bushing 54, so that the liquid within the respective rotor chambers will be permitted to freely flow and not affect the pistons of the respective rotors so that the driven element is unaffected by the rotation of the driving element. It is thus apparent that the movement of the valves against the tension of the springs 61, will gradually decrease the registration between the ports of the valves 57 and the bushing 54 and finally close the ports of the bushing 54, so that the liquid within the respective rotor chambers will be prevented from circulating therewithin and be held in a static condition. Thus the liquid due to the static condition will form a connecting means between the pistons of the respective rotors within the rotor chambers and provide a transmitting means between the driving and driven elements.

When the parts are in the position as shown in Fig. 1, the driving element is rotating the shaft 9 and sleeve 11 and consequently the rotor chamber is in what is known as the forward direction it simply being necessary to actuate the respective valves 57 to regulate the speed that it is desired to drive the driven shaft D'. Should it be desired to reverse the direction of rotation of the rotor casing and consequently the rotors and driven element, the lever 77 is moved toward the rotor casing and as the same actuates the rock shaft 78, the yoke 79 will move the spool 18 and consequently throw the clutch wheel 15 from engagement with the clutch 5 of the fly wheel 4, and throw the clutch face 17 in engagement with the clutch face 80 of the stationary reverse clutch member 81. This action will cause the shaft 9 to be rotated and rotate the gear 24, which through the gears 27 will transmit motion to the toothed band 25, and consequently rotate the rotor casing M in a reverse direction; the valves 57 being then actuated as before stated will permit a variable speed in reverse direction to be imparted through the rotors 40, 40' and 40'' to the driven element or shaft D'.

The stationary clutch or brake band 81 is secured rigidly within the casing C and preferably to the lower section thereof, the same providing, as described, a braking means to prevent the rotation of the clutch wheel 15 and consequently the sleeve 11 during the reverse rotation of the rotor casing M and the driven element.

From the foregoing description, it is evident that the rotor casing provided with the respective rotors and pistons and the valves 57 as set forth and shown provides a means whereby the fluid, preferably oil, is permitted a free circulation to both sides of the pistons without the necessity or the use of an auxiliary receptacle for the pump, and by reason of the double friction clutch and differential gear system, the desired forward and reverse movement may be readily imparted to the driven element from the driving element and at any variation of speed, due to the control of the flow of fluid within the rotor casing, with a device constructed according to the present invention.

Although in the present instance the construction has been shown, it is understood that the arrangement of several parts may be altered to suit conditions, that is the flexible connections between the driving and driven shafts may be dispensed with and rigid connections there employed where occasion will permit, the main principle being in the construction and arrangement of the rotor casing, pistons, valve control and reversing gears, with the various operating mechanisms therefor.

What is claimed is;

1. The combination with a driving element and a driven element, of a variable speed fluid transmitting mechanism interposed therebetween, and having a stationary incasing shell, rotatable means mounted in the respective ends of said shell and operably connected to the respective driving and driven elements, a rotor casing mounted for rotation within said shell and provided with a plurality of rotor chambers each of which is provided with two ports leading thereinto, two slidably mounted hollow cylindrical valves slidingly mounted in the rotor casing for controlling the respective ports to permit the circulation or non-circulation of the fluid within the respective rotor chambers said valves being in communication with each other, means for actuating said valves, a plurality of rotors one to each rotor chamber mounted in the rotor casing, a single piston carried by each rotor, and a shaft operably connected to the driven element and to said rotors, said shaft being rotatably mounted in the rotor casing.

2. The combination with a driven element and a driving element, of a fluid transmission mechanism interposed therebetween and having a main frame, a rotor casing mounted for rotation in the main frame, a rotor mounted in the casing and operably connected to the driven element, said rotor casing being provided with two bores each in communication with the rotor casing, and also in communication with each other, a bushing disposed in each bore and having a plurality of ports and circumferential grooves in communication with the rotor chamber, spring actuated cylindrical valves, one to each bushing slidably mounted in each bushing and provided with ports to normally aline with the ports of the bushing, and manually operated means for simultaneously operating the valves.

3. The combination with a driving element and a driven element, of a fluid transmission mechanism interposed therebetween and having a main frame, a rotor casing mounted for rotation in the main frame, a rotor mounted in the casing and operably connected to the driven element, said rotor casing being provided with two parallel bores each in communication with the chamber of the rotor casing, a bushing disposed in each bore and having a plurality of ports and a circumferential groove in communication with the rotor chamber, spring actuated hollow cylindrical valve, one to each bushing slidably mounted in each bushing and provided with ports to normally aline with the ports of the bushing, and a circumferential groove to each series of ports, said casing being further provided with a by-pass leading from the bores of the respective valves to provide a complete passage way for the fluid within the rotor chamber and valves, and manually operated means for simultaneously operating the valves.

4. The combination with a driving element and a driven element, of a fluid transmission mechanism interposed therebetween and having a main frame, a rotor casing provided with a plurality of rotor chambers, said rotor casing being mounted for rotation in the main frame, a plurality of rotors one to each chamber mounted in the rotor casing, means for operably connecting said rotors with the driven element, said rotor casing being provided with two bores each in communication with the respective chambers of the rotor casing, a bushing disposed in each bore and provided with a plurality of ports in communication with the respective chambers of the rotor casing, a spring actuated hollow cylindrical valve slidably mounted in each bushing and provided with ports adapted to normally aline with the ports of the bushing to permit the entrance of the fluid from the rotor chambers into the body of the valve, said rotor casing being further provided with a by-pass forming communication between the bores of the respective valves, and manually operated means for simultaneously operating the valves.

5. The combination with a driving element and a driven element, of a fluid transmission mechanism interposed therebetween and having a main frame, a rotor casing provided with a plurality of rotor chambers, said rotor casing being mounted for rotation in the main frame, a plurality of rotors one to each chamber mounted in the rotor casing, means for operably connecting said rotors with the driven element, said rotor casing being provided with two bores each in communication with the respective chambers of the rotor casing and in communication one with the other, a bushing disposed in each bore and provided with a plurality of circumferentially disposed ports to each rotor chamber, said bushings being further provided with a circumferential groove in line with the ports to permit the fluid to pass about the bushings and enter all ports simultaneously, spring actuated hollow cylindrical valves one to each bushing slidably mounted in each bushing and provided with corresponding ports through its respective bushings and with circumferential grooves to each plurality of ports, and manually operated means for simultaneously operating the valves.

In testimony that I claim the foregoing as my own, I have hereto affixed my signature in the presence of two witnesses.

JOSEPH ROI MARCHESSEAULT.

Witnesses:
   ARTHUR MARCHESSEAULT,
   MOSES R. BROUILLARD.